United States Patent [19]

Calaceto

[11] 4,229,192

[45] Oct. 21, 1980

[54] CYCLONIC SCRUBBER WITH PERFORATED PLATE DISTRIBUTOR

[76] Inventor: Ralph R. Calaceto, 248 Palmer Ct., Ridgewood, N.J. 07450

[21] Appl. No.: 58,655

[22] Filed: Jul. 19, 1979

[51] Int. Cl.² .............................................. B01D 47/10
[52] U.S. Cl. ........................................ 55/238; 55/194; 55/191; 261/79 A
[58] Field of Search ................... 55/191, 194, 236–238

[56] References Cited

U.S. PATENT DOCUMENTS

| | | | |
|---|---|---|---|
| 2,238,824 | 4/1941 | Ryner | 55/236 X |
| 3,050,919 | 8/1962 | Tailor | 55/236 X |
| 3,233,882 | 2/1966 | Calaceto | 55/238 X |

*Primary Examiner*—John Adee
*Attorney, Agent, or Firm*—Blum, Kaplan, Friedman, Silberman & Beran

[57] ABSTRACT

A cyclonic scrubber provides for scrubbing of a gas by liquid distributed from a compartment encircling the tower thereof. The compartment has a perforated-plate bottom through which the liquid is sprayed into the tower. Maintenance is simplified due to the fact that the perforated plate is readily accessible. Moreover, only a single conduit is needed for supplying the liquid scrubbing-agent to the compartment.

22 Claims, 8 Drawing Figures

CYCLONIC SCRUBBER WITH PERFORATED PLATE DISTRIBUTOR

BACKGROUND OF THE INVENTION

In my U.S. Pat. No. 3,233,882, I disclose spray devices for use in combination with a cyclonic gas-scrubber where these spray devices, each comprising several spray nozzles, could be attached to the exterior of the tower at locations having corresponding openings. The principal advantage of this construction lies in the fact that the spray nozzles can be more or less readily detached from the exterior of the tower for cleaning and for replacement if necessary. However, the fact that such nozzles eventually wear and require replacement constitutes a substantial disadvantage. Moreover, the number of nozzles required to effect both injection of an adequate quantity of liquid and satisfactory dispersion of the liquid is relatively large. Further, spray nozzles do not generally permit recirculation of slurry solution without the hazard of plugging. In addition, the problem of sealing the nozzles against the exterior of the tower to prevent leakage of gas through the openings in the tower is substantial and involves a cost which is not negligible, the cost including relatively complex components and the labor of maintenance and installation. Accordingly, a simpler construction which avoids the above difficulties and costs is greatly to be desired.

SUMMARY OF THE INVENTION

A cyclonic gas-scrubber in accordance with the present invention comprises a tower divided at least into upper and lower cylindrical portions, the upper portion thereof being of smaller diameter than the lower portion. The bottom of the upper portion is disposed below the top of the lower portion and is joined to said lower portion by a perforated annular plate. A second annular plate joins the top of the lower portion to the exterior of the upper portion. The two annular plates in conjunction with the walls of the upper and lower portions of the tower constitute an annular compartment into which liquid can be introduced by means of a conduit, a single conduit being sufficient. The perforations in the lower annular plate provide for spraying the liquid into the lower portion of the tower for scrubbing the gas traversing the tower, the term spraying being taken to include gravity feed of the liquid.

The above construction can be expanded in that the tower may be divided into three or more cylindrical portions, each portion being of smaller diameter than the portion immediately below and each portion being joined to the portion immediately below by two annular plates forming a compartment around the upper of each pair of contiguous portions and proximate the bottom of the upper portion in each pair.

A port proximate an end of the tower provides for introduction of gas tangentially so that the gas moves through the tower in a helix. The height of the lowest portion of the tower should be at least equal to the diameter thereof. To increase the effectiveness of the scrubbing of the gas, a channel restriction plate, hereinafter referred to as a "baffle," is disposed in the tower proximate but below the junction between the lower and upper portions of the tower. In another embodiment of the invention, the perforated lower annulus is configured for dispersing the sprayed liquid across the entire cross-section of the tower. Such contouring also minimizes pressure drop as the gas passes from one portion of the tower to another.

An important feature of the present invention is that the scrubbing liquid, or slurry, may be sprayed into the tower under the effect of gravity alone, that is, without the use of a pressurizing pump. However, where the vessel is part of a pressure system, only a nominal pressure pump head will be required to feed the annular jet-plate manifold.

In one embodiment of the invention, the tower is provided with an introduction port proximate the bottom thereof for traversal of the tower by the gas stream in an upward direction. In another embodiment of the invention, the tower may be provided with an introduction port proximate the top thereof for causing the gas stream to traverse the tower in a downward direction. In either case, the introduction port is constructed for introducing the gas stream tangentially. Where the gas stream moves through the tower in a downward direction, provision must be made for separating the gas stream from the scrubbing liquid or slurry. This means can comprise a trough around the interior of the tower proximate the bottom thereof or can be based on the presence of a centrally disposed port having a cap thereover for deflecting the liquid or slurry. In this case, preferably, arcuate vanes are provided for converting the tangential component of the gas flow into radial flow directed toward the axis of the gas discharge port.

Embodiments of the invention incorporating two or more annular compartments, each having a perforated lower annular plate, make it possible to treat a gas with two different scrubbing liquids or slurries or a single liquid or slurry at two or more different concentrations.

Accordingly, an object of the present invention is a cyclonic gas-scrubber of increased effectiveness and lower cost both with respect to construction and with respect to maintenance.

Another object of the present invention is a cyclonic gas-scrubber which minimizes wear of the liquid-dispersing element so that replacement is unnecessary.

A further object of the present invention is a cyclonic gas-scrubber in which the spray mechanism is an integral part of the tower itself.

An important object of the invention is a cyclonic gas scrubber in which liquid dispersion may be effected by gravity alone.

A significant object of the invention is a cyclonic gas scrubber in which a gas may be scrubbed with two or more different scrubbing liquids or slurries.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
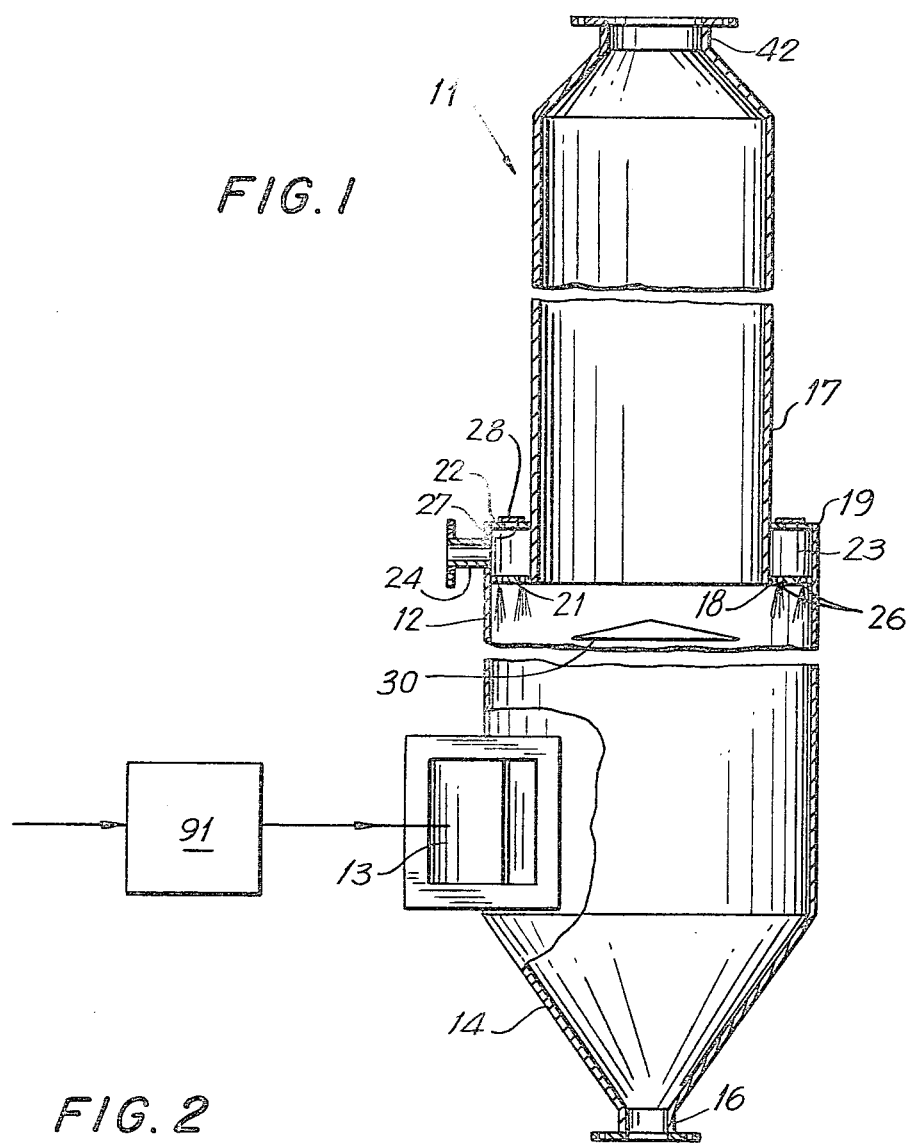
FIG. 1 is a sectional view of a cyclonic gas-scrubber in accordance with the present invention.

A cyclonic gas-scrubber, indicated generally by the reference numeral 11, is shown in FIG. 1, said scrubber having a lower portion 12 into which gas is introduced tangentially proximate the bottom of said lower portion through port 13. Optionally, said lower portion 12 may be fitted with a scroll, not shown. Below lower portion 12 are disposed conical collector 14 and liquid outlet 16. The height of the lower portion 12 is at least equal to the diameter thereof in order to provide that a gas rising therethrough will be scrubbed to the desired extent. The height of lower portion 12 may be up to three or even more times the diameter thereof, the upper limit of the height being set by economics and strength considerations. The overall height of the scrubber portions is at least three times the diameter of lower portion 12.

The tower of the gas scrubber is comprised of lower portion 12 and upper portion 17, the diameter of upper portion 17 being smaller than that of lower portion 12 so that the bottom 18 of upper portion 17 fits within the top 19 of lower portion 12. The two portions are joined by lower annular plate 21 and upper annular plate 22, upper annular plate 22 also supporting upper portion 17. The two annular plates and the upper and lower portions form an annular compartment 23 at the top of lower portion 12. Liquid can be introduced into compartment 23 through conduit 24 for delivery into the interior of lower portion 12 through perforations 26 in lower annular plate 21. Since annular compartment 23 surrounds the tower, only one conduit is needed for introduction of scrubber liquid thereinto, thereby simplifying construction and lowering the costs of the structure. The diameter of upper portion 17 is chosen to make compartment 23 of appropriate size for transit of scrubber liquid therethrough and to provide for adequate separation of scrubber liquid from the gas stream rising therethrough. Portions of lower plate 21 are preferably removable for maintenance.

Upper annular plate 22 has openings 27 therethrough for inspection and maintenance of lower annular plate 21. Each opening 27 is provided with a cover 28.

Figure 2:
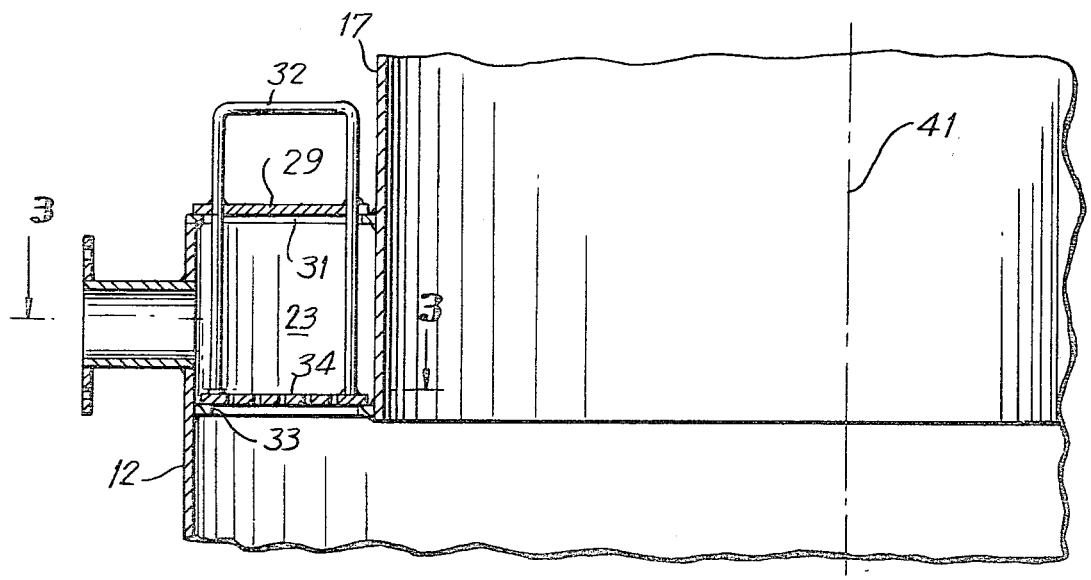
FIG. 2 is a partial sectional view in enlarged scale of another embodiment of the invention.

The structure of the compartment can be varied in a number of ways. In the embodiment shown in FIG. 2, cover 29 over opening 31 has a handle 32. The handle extends downward through opening 31 to removable section 34 of lower annular plate 33. Lifting cover 29 by means of handle 32 lifts removable section 34 at the same time. The relative sizes of removable section 34 and opening 31 are such that the removable section can pass therethrough. This makes it possible to take out the perforated sections for cleaning or replacement should replacement become necessary as a result of wear or corrosion. Moreover, depending upon the type of operation to be carried out in the scrubber, it might be desirable to change the type or size of perforations in the lower annular plate. Such a situation may arise in the change from removal of entrained particulate matter from a gas by means of a scrubbing liquid to absorption of an acid component by a slurry containing suspended soda ash or limestone.

Figure 3:
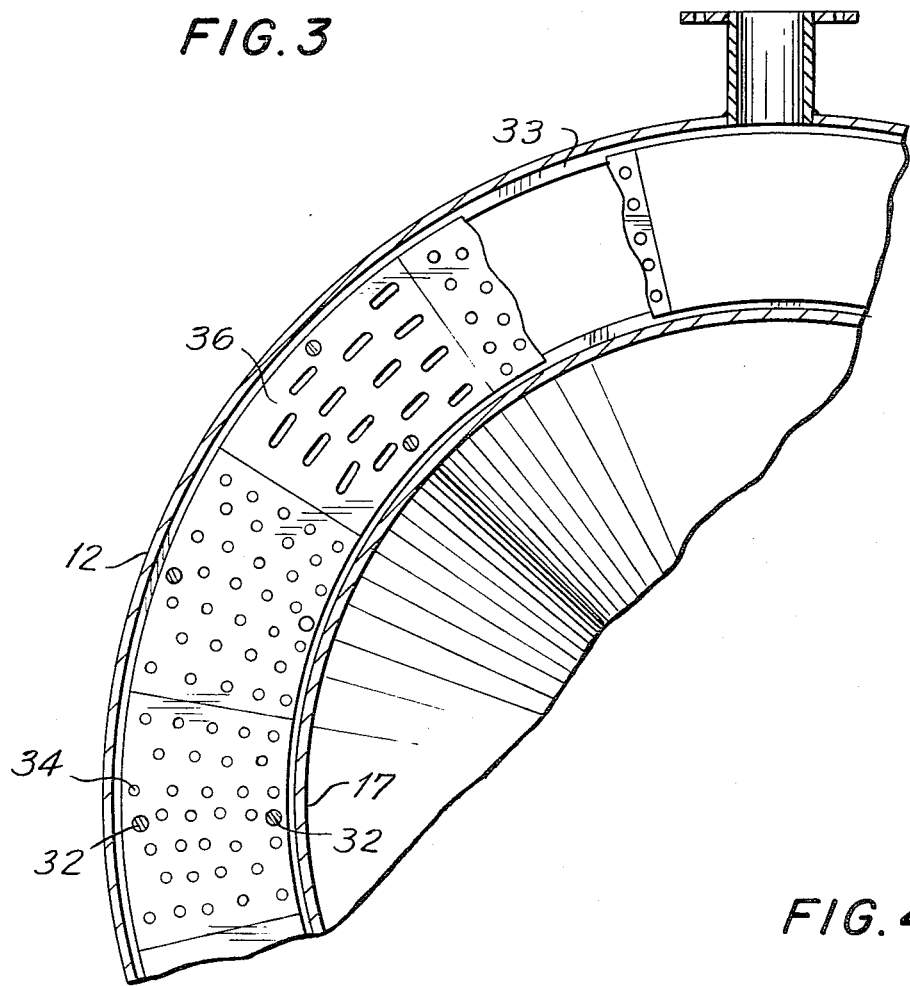
FIG. 3 is a view taken along line 3—3 of FIG. 2.

FIG. 3 shows a plate section 34 which has circular apertures therein. Removable section 36 has slotted apertures therein. As is evident, apertures of any desired shape may be used either in the embodiment of FIGS. 2 and 3 or in the embodiment of FIG. 1. Moreover, the apertures may be shaped for directing the spray to all parts of the cross-section of the lower portion 12. It should be noted that the construction of annular compartments 23 is such that the liquid or slurry therein may be sprayed under the effect of gravity alone, although a pump (not shown) may be used if desired. In the embodiment of FIG. 1, the spray will fall essentially straight downwards; however, the major portion of the gas stream hugs the wall in a cyclonic gas scrubber and therefore encounters the spray. In addition, a channel restriction plate or baffle 30 may be positioned as shown to assure that no gas travels along the axis of the scrubber, thus avoiding the spray. The diameter of the baffle should be from about $\frac{1}{3}$D to about $\frac{7}{8}$D, where D is the diameter of lower portion 12, and for maximum effectiveness with minimum pressure drop, the diameter of the baffle is preferably 0.5D to 0.7D.

Figure 4:
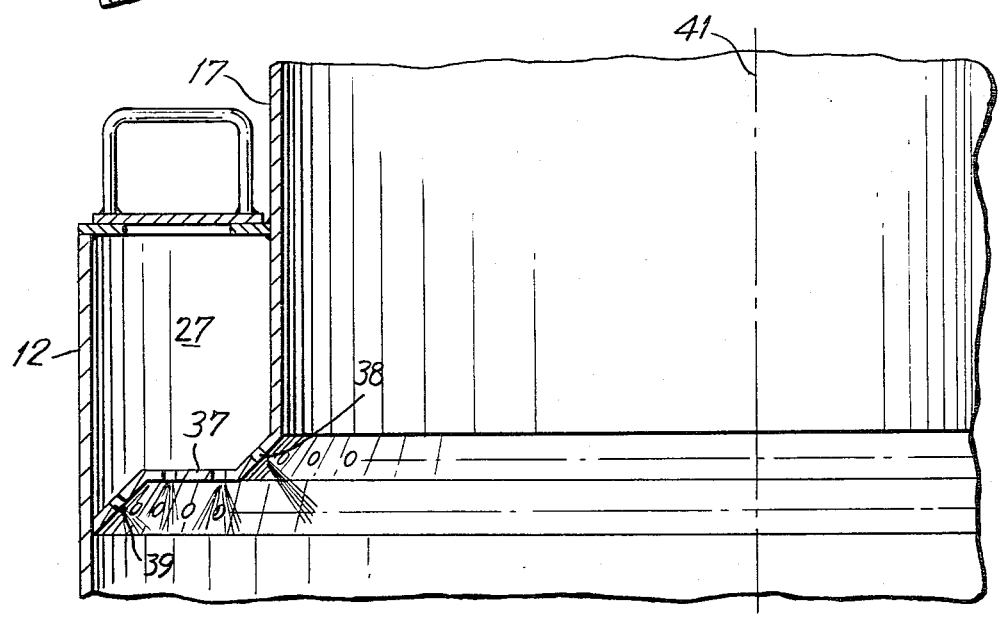
FIG. 4 is a partial sectional view in enlarged scale of yet another embodiment of the invention.

A configuration which is convenient for directing spray throughout the tower and particularly toward the axis thereof is shown in FIG. 4, in which lower annular plate 37 is contoured, such a shape providing a number of advantages. Plate 37 is disposed essentially diagonally with respect to the remainder of the structure, thereby strengthening same. In addition, the configuration smooths the flow of gas from the lower portion to the upper portion of the tower, thereby decreasing the pressure drop in the gas stream as it enters the upper portion. Finally, apertures 38 and 39 are directed toward the axis 41 of the scrubber. If desired, plate 39 or portions thereof may be removable.

The use of a large perforated area for introduction of spray makes it possible for the perforations themselves to be relatively large. Consequently, a concentrated slurry solution which could not possibly be injected through spray nozzles can be fed to compartment 27 for injection into the tower. The concentrated slurry solution can be a recycle. The recycle, of course, is collected from the conical collector 14 and may be directed first to a recycle tank. Alternatively, the liquid from conical collector 14 may be pumped to a process recovery system or directed to a waste-handling apparatus. Collection of the liquid from the gas stream is effective because of the fact that the spiral transit of the gas through the tower applies sufficient centrifugal force to the droplets to disengage them from the stream by bringing them to the wall from which they can flow downward into the collector 14.

Figure 5:
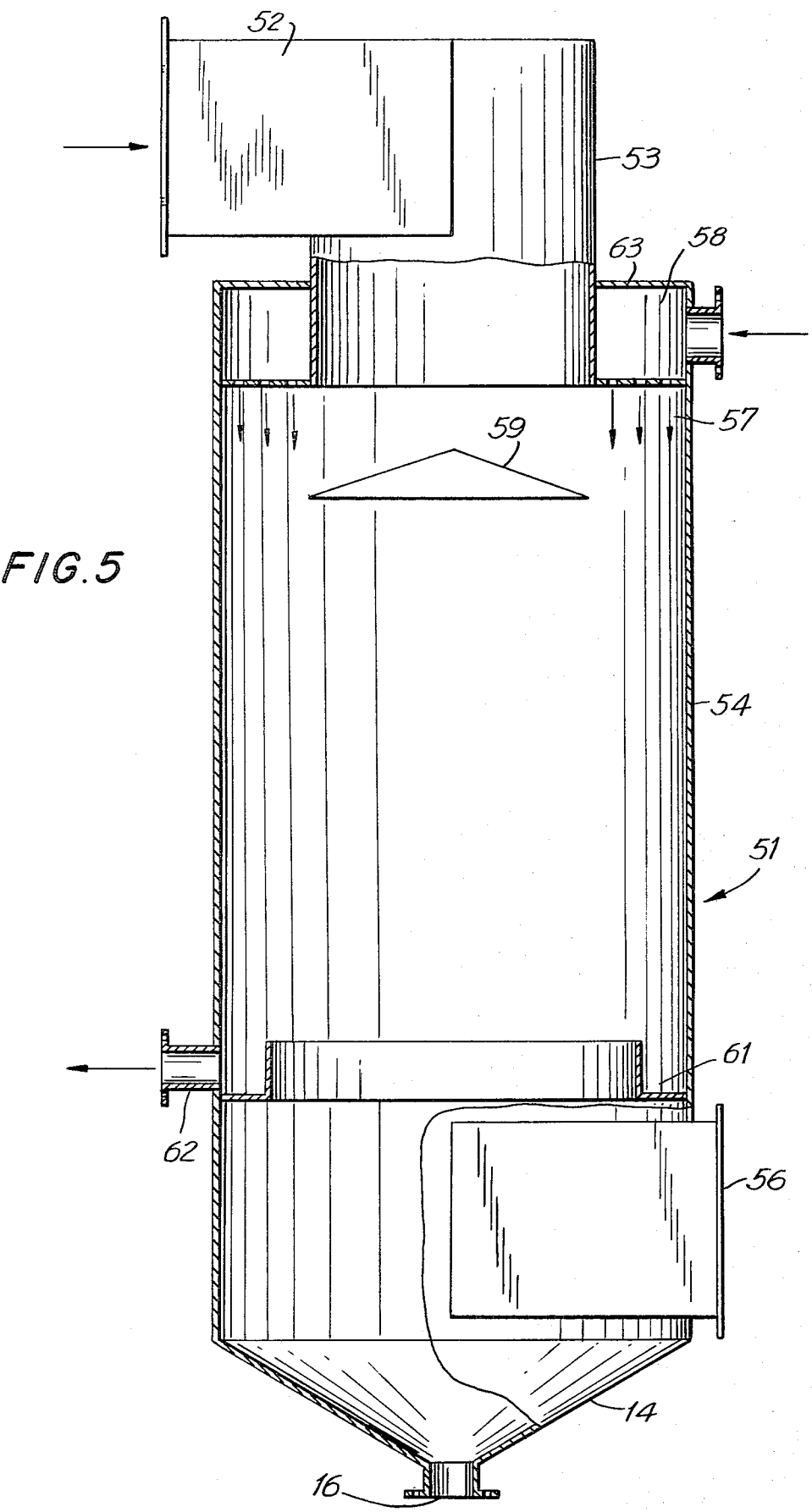
FIGS. 5 and 6 are sectional views of embodiments of the invention constructed for downward traversal by a gas stream.

It should be noted that FIG. 1 shows only one of many possible configurations for the cyclonic scrubber of the present invention. Thus, the top central discharge for the gases as indicated at 42 may be substituted by either radial or tangential horizontal discharge. Also, the scrubber may be constructed for downward flow of the gas stream as shown in FIG. 5, the gas stream entering scrubber 51 through introduction port 52 to proceed through upper portion 53 to lower portion 54 and out through gas discharge port 56. The gas stream encounters spray 57 from annular compartment 58. Baffle 59 directs the gas stream into the spray. The major portion of the liquid or slurry is caught in trough 61 and exits the column through port 62, trough 61 being positioned immediately above gas discharge port 56. The remainder of the liquid is collected in conical bottom 14 and leaves through port 16. Introduction port 52 injects the gas stream tangentially and for minimal pressure drop in the system gas discharge port 56 is constructed for taking the gas stream from the column tangentially also. It should be noted that, as with the construction of the other embodiments, the use of the baffle 56 is optional since the major portion of the gas stream hugs the wall. It is also significant that the height of upper portion 53, relative to that of lower portion 54 is relatively small, the reason being that provision for separation of the gas and liquid components in this region need not be made, in contrast to the situation which obtains in the construction of FIG. 1 where the gas and liquid streams move in opposite directions. As shown in FIG. 5, the height of portion 53 need only be great enough to provide enough space for removal of sections of annulus 63.

Figure 6:
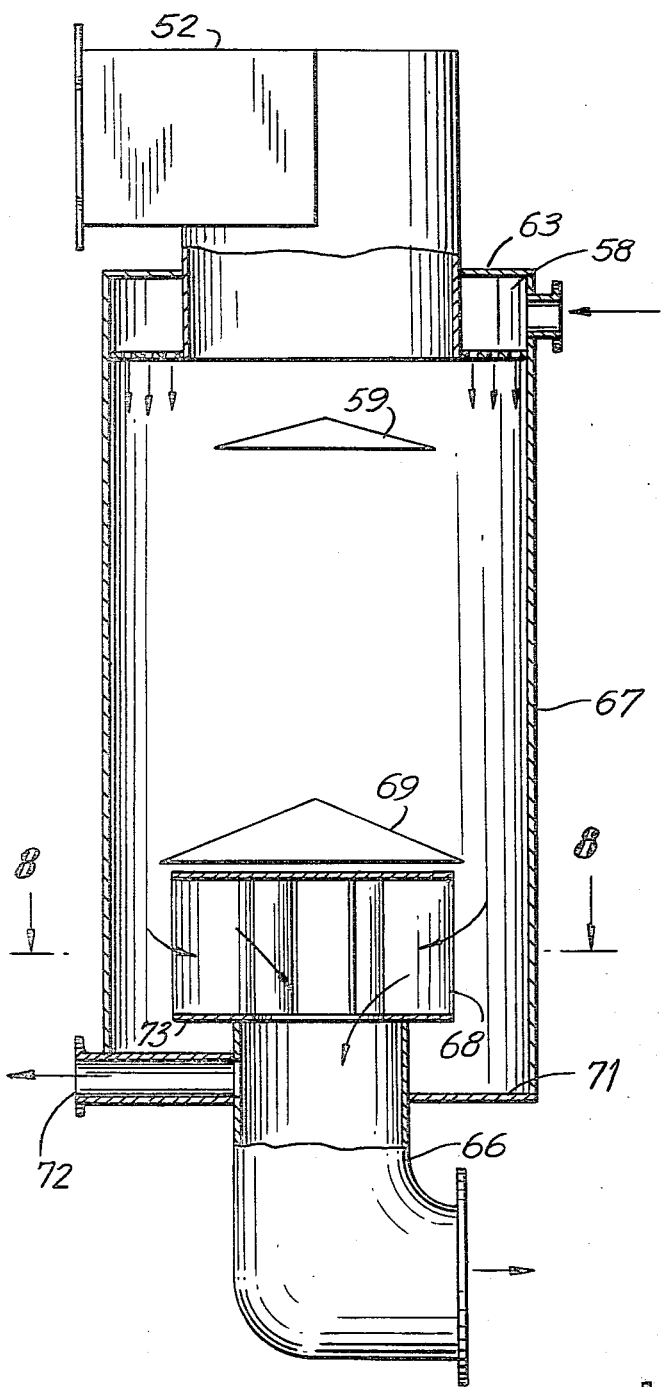
Figure 8:
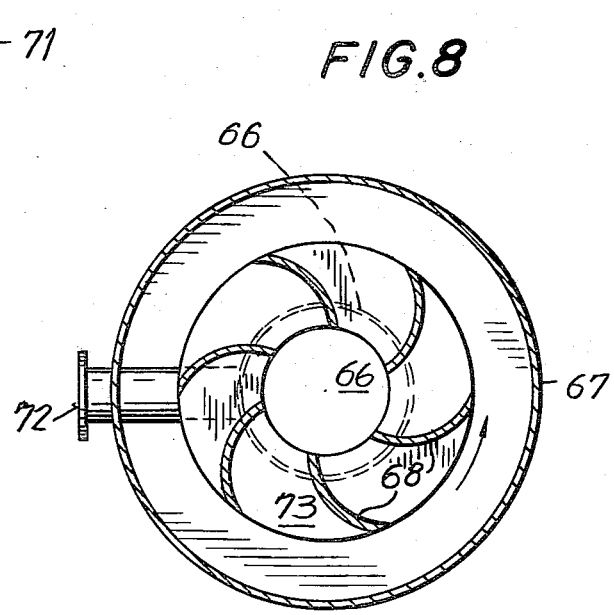
FIG. 8 is a view taken along line 8—8 of FIG. 6.

FIG. 6 shows an embodiment of the invention which is a modification of that of FIG. 5 in that gas discharge port 66 is centrally located with respect to cyindrical shell 67 of the scrubber. However, the pressure drop on entry of the gas into port 66 would be excessive if it were not for the presence of anti-swirl vanes 68 shown in vertical section in FIG. 6 and in horizontal section in FIG. 8. Said anti-swirl vanes convert the rotating flow in the gas stream into radial flow and thence into downward flow through gas discharge port 66, thereby minimizing the entry pressure drop. Shield or baffle 69 diverts the falling spray to bottom end plate 71, the collected liquid then leaving the scrubber through liquid exit port 72.

Figure 7:
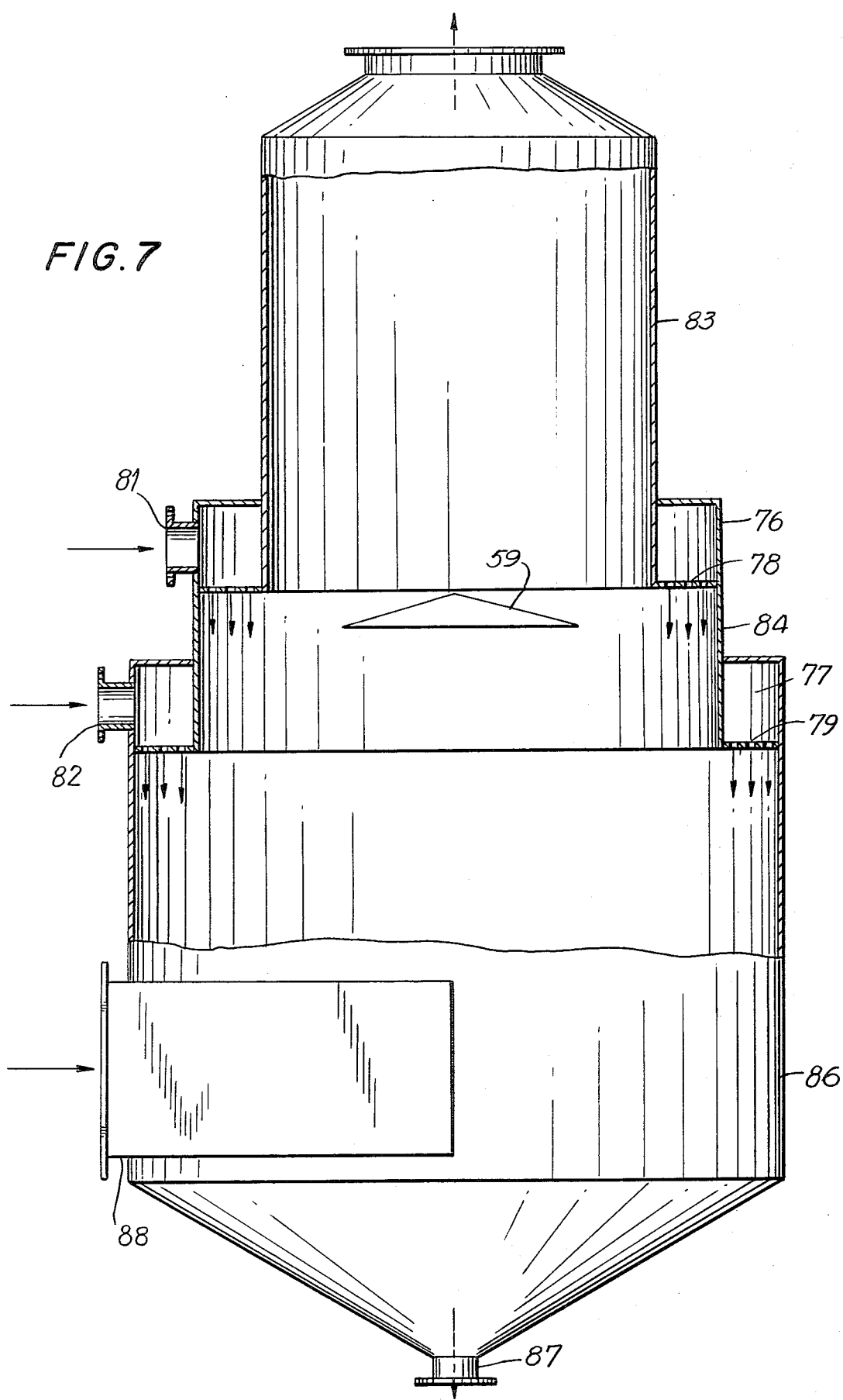
FIG. 7 is a sectional view of an embodiment of the invention providing for scrubbing of a gas stream by a plurality of scrubbing liquids or slurries.

FIG. 7 shows an embodiment of the invention which expands the concept of FIG. 1 in that it provides for a plurality of annular compartments, the number of compartments shown in FIG. 7 being two. The annular compartments in FIG. 7 are given the reference numerals 76 and 77, these being fitted respectively with lower annular perforated plates 78 and 79. As will be evident, a construction providing two annular compartments requires two liquid entry ports 81 and 82 and three tower portions, these being termed upper portion 83, intermediate portion 84 and lower portion 86. Although a cyclonic gas scrubber providing for the spray of a plurality of liquids or slurries may be used for downward flow of gas, upward flow of the gas stream is strongly preferred for reasons which will become evident. As is well known, in countercurrent mass transfer, it is desirable that the difference between the concentrations of the component being transferred in the different phases be held as nearly constant as possible. In other words, where the concentration of the components to be removed from the gas stream is high, then the concentration of that component in the liquid stream may also be relatively high. However, where the concentration of said components in the gas stream is low, a situation which prevails, it is hoped, near the exit port, then the concentration of the components of the liquid stream must be essentially zero. The construction of the embodiment of FIG. 7 provides for scrubbing by a liquid at two different concentrations. Thus, makeup scrubbing liquid is supplied through compartment 76 and perforated plate 78 and recycled liquid or slurry collected from exit port 87 is redirected into the column through annular compartment 77 and perforated plate 79. Naturally, some portion of the recycled liquid must be drawn off so as to hold the quantity of liquid traversing the column constant. It will be noted that the scrubber of FIG. 7 provides for treating of the gas stream entering introduction port 88 with recycled scrubbing liquid or slurry, the gas stream as it enters the scrubber having the highest concentration of the component to be removed. Moreover, as the gas stream moves up the scrubber tower, it then meets the scrubbing agent from the upper compartment 76, said upper compartment supplying makeup agent having a zero or low concentration of the component to be removed. Such a construction meets the requirement of minimizing the variation in the difference in concentration between the two phases. In addition, it is economical with respect to the scrubbing agent in that the scrubbing agent comes in contact with the gas twice rather than once.

A further advantage derives from the construction of FIG. 7 where it is desired to remove two different components from the gas stream in which case two different scrubbing agents may be used. Thus, an aqueous slurry could be fed from compartment 77 for the removal of an acid compcnent, in which case a suspension of sodium carbonate or calcium carbonate might be employed. Then, an organic component, such as a petroleum fraction, could be removed by the use of a solvent spray introduced through compartment 76, the solvent being immiscible with the liquid of the slurry. The organic solvent and the liquid of the slurry could then be separated in an appropriate device exterior to the column.

Slurry sprays are particularly effective for the treatment of $SO_2$- containing exhaust gas from power-generating plants. The slurry is then an aqueous suspension of limestone.

The relative heights of the three scrubber portions depends upon the required efficacy of removal desired with respect to the components to be absorbed by the spray. In general, the height of intermediate portion 84 is usually equal to or less than the height of lower portion 86, the ratio of the height of intermediate portion 84 to the height of 86 preferably being from about 0.5 to 0.7. The height of upper portion 83 depends upon the velocity of the gas stream and is such as to provide for the desired degree of removal of entrained droplets.

Cyclonic gas scrubbers are particularly effective for removal of particulate matter in the micron range but are generally less effective with respect to removal of particles of sub-micron size. Accordingly, any of the embodiments of the present invention may be combined with a venturi scrubber, the combination being particularly useful for removal of particulate matter which may vary in size from sub-micron to micron size. Such a combination is shown schematically in FIG. 1 wherein a venturi scrubber 91 is disposed upstream of gas introduction port 13 for removal or agglomeration of particulate matter of sub-micron size prior to entry of said gas stream into cyclonic gas-scrubber 11.

It will thus be seen that the objects set forth above, among those made apparent from the preceding description, are efficiently attained, and since certain changes may be made in the above construction without departure from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An improvement in a cyclonic gas-scrubber including a vertical tower shell having cylindrical portions and introduction port means for introducing a gas stream tangentially into one of said portions thereof for movement in a spiral through said tower shell toward the other of said portions, said improvement comprising:

a cylindrical lower tower shell portion having a height at least twice the diameter thereof, said cylindrical upper tower shell portion having a diameter smaller than that of said lower portion, the bottom of said upper portion being disposed below the top of said lower portion;

a lower annulus joining said lower portion proximate and below the top thereof to said upper portion proximate the bottom thereof, said lower annulus being perforated for spraying liquid or slurry therethrough;

an upper annulus disposed above and spaced apart from said lower annulus and joining said lower portion of said upper portion, said upper and lower tower shell portions and said upper and lower annuli forming an annular compartment around said upper tower shell portion and proximate the bottom thereof; and conduit means for introducing scrubber liquid or slurry into said compartment and thereby through said lower annulus to said lower portion, the diameter of said upper portion being large enough for transit of said gas stream therethrough with but minimal pressure drop and for effective separation of said scrubber liquid or slurry from said gas stream to occur where the direction of flow of said gas stream is upward.

2. The improvement in a cyclonic gas-scrubber as defined in claim 1, wherein said lower annulus has perforations therein sized for delivering said liquid or slurry under the effect of gravity alone.

3. The improvement in a cyclonic gas-scrubber as defined in claim 1, wherein said upper annulus has an opening therein for inspection and cleanout of said lower annulus and said compartment, and further comprising cover means for said opening.

4. The improvement in a cyclonic gas-scrubber as defined in claim 3, wherein said lower annulus includes a removable perforated section, said opening being large enough for transit of said section therethrough, thereby providing for easy servicing and optional replacement of said section.

5. The improvement in a cyclonic gas-scrubber as defined in claim 4, wherein said section is attached to said cover means for removal of said section from said lower annulus on lifting of said cover means.

6. The improvement in a cyclonic gas-scrubber as defined in claim 1, wherein said lower annulus has perforations therein shaped for directing said liquid to the entire cross-section of said lower portion.

7. The improvement in a cyclonic gas-scrubber as defined in claim 1, wherein the height of said lower portion is at least equal to the diameter thereof.

8. The improvement in a cyclonic gas-scrubber as defined in claim 1, wherein said conduit means consists of a single conduit.

9. The improvement in a cyclonic gas-scrubber as defined in claim 1, wherein said lower annulus is contoured for minimization of pressure drop in said gas stream leaving one of said portions and entering said other portion.

10. The improvement in a cyclonic gas-scrubber as defined in claim 1, further comprising a baffle disposed below the bottom of said upper portion for directing said gas stream toward the wall of said lower chamber and thereby into liquid delivered from said lower annulus.

11. The improvement in a cyclonic gas-scrubber as defined in claim 10, wherein said baffle has an essentially circular outer edge, the diameter of said baffle being from $\frac{1}{2}$ to $\frac{7}{8}$ that of said lower portion, the diameter of said lower portion being hereinafter termed "D".

12. The improvement in a cyclonic gas-scrubber as defined in claim 11, wherein the diameter of said baffle is from 0.5D to 0.7D.

13. The improvement in a cyclonic gas-scrubber as defined in claim 11, wherein said baffle is in the form of a shallow-cone and is disposed with the point of said cone directed upwardly.

14. The improvement in a cyclonic gas-scrubber as defined in claim 11, wherein introduction port means is proximate the bottom of said lower portion for transit of said gas stream through said tower in an upward direction.

15. The improvement in a cyclonic gas-scrubber as defined in claim 14, further comprising venturi scrubber means disposed for treating said gas stream prior to entry of said stream into said introduction port means.

16. The improvement in a cyclonic gas-scrubber as defined in claim 1, wherein said introduction port means is disposed proximate the top of said upper portion for downward flow of said gas stream, and further comprising gas discharge port means disposed proximate the bottom of said lower portion for tangential discharge of said gas stream.

17. The improvement in a cyclonic gas-scrubber as defined in either of claims 1 or 16, further comprising trough means around the interior of said lower portion for collection of sprayed liquid or slurry thrown against said wall by said gas stream, and side port means connecting said trough means with the exterior of said tower shell for flow of said liquid or slurry to the exterior of said shell.

18. The improvement in a cyclonic gas-scrubber as defined in claim 1, wherein said introduction port means is disposed proximate the top of said upper portion for downward flow of said gas stream, and said lower portion has a bottom end plate, and further comprising gas discharge port means centrally disposed in and projecting above said bottom end plate for axial discharge of said gas stream, arcuate vanes immediately above said gas discharge port means arranged and constructed for converting the helical flow of said gas stream into radial flow and thus toward said centrally disposed gas discharge port means, and liquid discharge port means for outward flow of liquid or slurry collected on said bottom end plate.

19. The improvement in a cyclonic gas-scrubber as defined in claim 18, further comprising a cap over said vanes for prevention of entry of downwardly falling liquid or slurry into said vanes and thence into said gas discharge port means.

20. The improvement in a cyclonic gas-scrubber as defined in claim 1, further comprising a secnd cylindrical upper tower shell portion having a diameter smaller than that of said upper portion, hereinafter termed "intermediate portion", the bottom of said second upper portion being disposed below the top of said intermediate portion;

a second lower annulus joining said intermediate portion proximate and below the top thereof to said second upper portion proximate the bottom thereof, said second lower annulus being perforated for spraying liquid or slurry therethrough;

a second upper annulus disposed above and spaced apart from said second lower annulus and joining said intermediate portion to said second upper portion, said second upper and lower annuli forming a second annular compartment around said second upper tower shell portion and proximate the bottom thereof; and second conduit means for introducing scrubber liquid or slurry into said second annular compartment, and thereby through said second lower annulus to said intermediate and lower portions, the diameter of said second upper portions being large enough for transit of said gas stream therethrough with but minimal pressure drop and for effective separation of said scrubber liquid or slurry from said gas stream to occur when the direction of flow of said gas stream is upward.

21. The improvement in a cyclonic gas-scrubber as defined in claim 20, wherein the ratio of the height of said intermediate portion to that of said lower portion is from 0.5 to 1.

22. The improvement in a cyclonic gas-scrubber as defined in claim 1, further comprising venturi scrubber means disposed for removal or agglomerating of submicron particulate matter from said gas stream.

* * * * *